April 2, 1968 M. H. PELOSI, JR 3,375,640
AIR FILTER APPARATUS
Filed June 13, 1966

INVENTOR.
MICHAEL H. PELOSI, JR.
BY
ATTORNEY

United States Patent Office 3,375,640
Patented Apr. 2, 1968

3,375,640
AIR FILTER APPARATUS
Michael H. Pelosi, Jr., Broomall, Pa., assignor to CRS Industries, Inc., Philadelphia, Pa., a corporation of Pennsylvania
Filed June 13, 1966, Ser. No. 557,185
6 Claims. (Cl. 55—276)

ABSTRACT OF THE DISCLOSURE

Air purifier apparatus of the portable type having a housing containing a vibration free mounted blower and motor assembly with a prefilter connected to the blower inlet and an absolute HEPA filter connected to the blower outlet, the filters being detachably connected respectively to the inlet and outlet by ducts of flexible material, and the cabinet being insulated to reduce noise of operation.

---

This invention relates to an air purifier apparatus and more particularly to such apparatus that provides a clean supply of air and which may have an automatic filter contamination warning system.

Some recent observations of hospital operation have elicited the discovery that a great deal of disease infection within hospitals results from air contaminated by germs and viruses which contaminated air is circulated within the hospital spreading germs throughout.

While there are air purifier units available they are bulky, non-portable, and difficult to keep clean and to service. None of these units are useful on an individual patient basis for supplying clean germ free air to a single patient.

The principal object of the present invention is to provide an air purifier that is economical in operation and in which access for service is quickly and easily effected.

A further object of the present invention is to provide an air purifier that is quiet in operation and which can have incorporated therein an automatic filter contamination warning system.

A further object of the present invention is to provide an air purifier that permits of filter change by untrained personnel.

A further object of the present invention is to provide an air purifier that is portable and presents an attractive appearance.

A further object of the present invention is to provide an air purifier that is simple and inexpensive to construct but sturdy and reliable in operation.

A further object of the present invention is to provide an air purifier that provides clean air in large volume and which can be readily modified to increase or decrease the volume of air provided.

A further object of the present invention is to provide an air purifier that makes available a source of clean air suitable for use in a hospital room, patient enclosure, clean room or at a clean bench.

Other objects and advantageous features of the invention will be apparent from the description and claims.

The nature and characteristic features of the invention will be more readily understood from the following description taken in connection with the accompanying drawings forming part thereof, in which.

Figure 1:
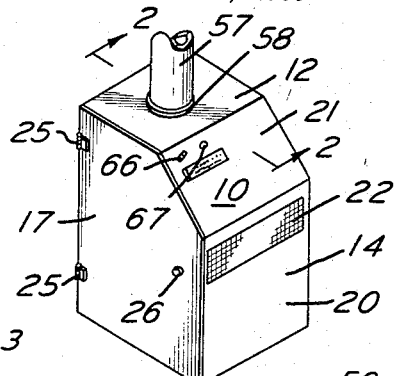
FIGURE 1 is a view in perspective of an air purifier in accordance with the present invention.
Figure 2:
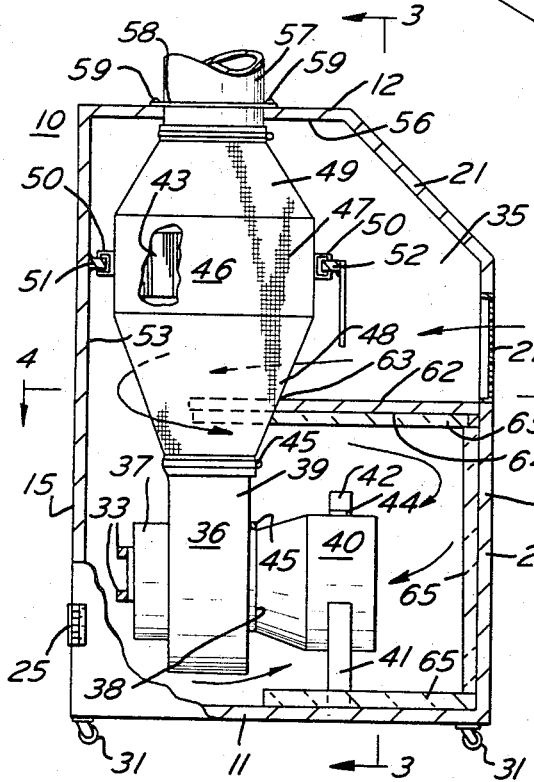
FIG. 2 is a vertical sectional view, enlarged, taken approximately on the line 2—2 of FIG. 1.
Figure 3:
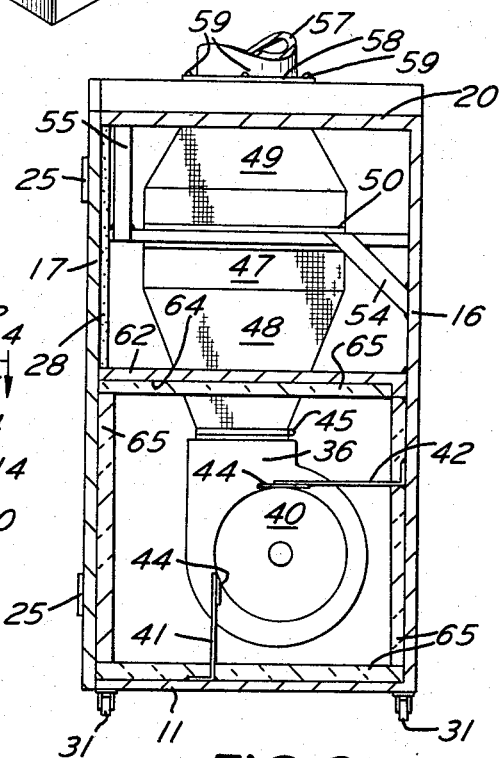
FIG. 3 is a vertical sectional view taken approximately on the line 3—3 of FIG. 2.
Figure 4:
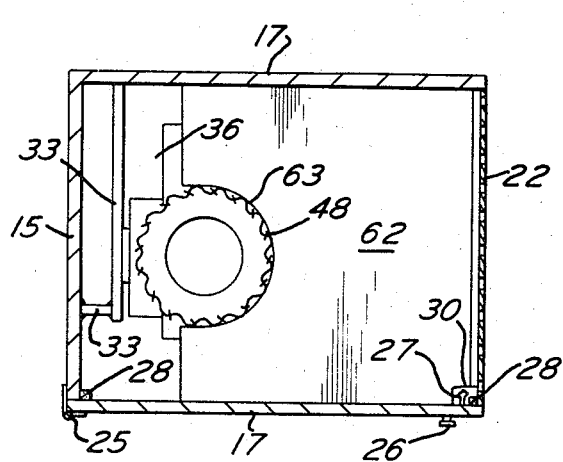
FIG. 4 is a horizontal sectional view taken approximately on the line 4—4 of FIG. 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, an air purifier apparatus is there illustrated. The apparatus includes an outer enclosing cabinet 10 of substantially rectangular horizontal shape, with horizontal bottom wall plate 11, horizontal top wall plate 12, front and rear connecting walls 14 and 15, and vertical side walls 16 and 17. The cabinet 10 can be made of any suitable material, such as enameled sheet metal, or laminate covered plywood but other suitable materials can be used if desired.

The front wall 14 is composed of two parts, a vertical lower panel 20 and an upper angularly inclined panel 21 which connects panel 20 to the top plate 12. The panel 21 is angularly inwardly inclined as it extends upward to the plate 12. The lower panel 20 has a grille 22 fixedly secured therein, located near the top of wall 20 and in the center thereof. The grille 22, as illustrated, is formed of expanded stainless steel sheet but can be of any suitable material that is non-corrosive and easy to keep clean.

The side wall 16 is fixedly secured to the top and bottom plates 11 and 12 and to the front and rear walls 14 and 15.

The side wall 17 however is swingably mounted by hinges 25 which are secured to the rear wall 15 and side wall 17. The wall 17 is provided with a knob 26 and catch 27. The wall 17 preferably has a gasket 28 around its sides abutting the walls 14 and 15 and the plates 11 and 12 to prevent air leakage. The side wall 17 has its catch 27 engaged by a projection 30 on the lower panel 20 of the front wall 14 and can swing about hinges 25 to permit of access to the interior 35 of the cabinet 10.

The bottom plate 11 is provided with four swivel casters 31 of conventioinal type mounted under its four corners so that the cabinet 10 can be readily moved to any location for use, as desired.

The air supply and filtering equipment is located within the interior 35 of the cabinet 10 and includes a blower unit 36 with an electric motor 37 of conventional type mounted on the wall 16 by vibration isolators 33. The blower unit 36 has its air inlet side 38 facing towards the lower panel 20 of the front wall 14 and its outlet side 39 facing vertically upwardly. A prefilter 40 of well known type is provided detachably connected to the inlet side 38 of blower unit 36 and mounted by channels 44 engaged in brackets 41 and 42 which are secured to the bottom plate 11 and side wall 16. The pre-filter 40 is retained on inlet side 38 of blower unit 36 by a fabric duct and encircling clamp 45 of well known type.

A final filtering assembly 46 is provided with its inlet duct 48 attached to and retained on blower air outlet 39 by an encircling clamp 45. The filtering assembly 46 includes a central portion 47 containing the filter 43 and upper and lower connecting ducts 48 and 49. The ducts 48 and 49 are preferably of textile fabric with a coating or lamination of synthetic plastic material, or may be of synthetic plastic material. The construction of the ducts 48 and 49 in this manner eliminates transmission of mechanical vibration from the blower unit 36 and provides for much quieter operation.

The central portion 47 contains a fluid filter 43 which may be of any suitable type but which is preferably of the high efficiency particulate air or HEPA family that is capable of providing a filtering efficiency as high as 99.97%, and may be such as that referred to in my U.S. application, filed May 31, 1966, Ser. No. 553,841.

The central portion 47 is removably mounted by channels 50 on two horizontally extending tracks 51 and 52, the mounting being cushioned and preferably like that shown in my prior application referred to above. The track 51 is mounted on the inside face 53 of rear wall 15 and extends transversely inside cabinet 10. The track 52 is mounted at its right side on the side wall 16 by gusset 54 and at its left side by vertical gusset 55 which is fastened to the underside 56 of top plate 12. The duct 48 is connected at its upper end to an air delivery outlet exit 57 of substantially circular shape in cross section which outlet 57 is mounted by collar 58 and screws 59 in the top plate 12 of cabinet 10 and extends upwardly or as desired for delivery of clean air to the desired location in the room.

An interior wall panel 62 is provided secured to the front wall 14 and extending horizontally rearwardly with a U-shaped cut-out 63 therein to provide clearance for the lower duct 48 and which panel 62 extends rearwardly of a depth of about three quarters of the total depth of the cabinet 10. The panel 62 is preferably flush with the bottom of grille 22 and provided on its underside 64 with suitable panels of sound absorbing material 65. The panels of sound absorbing material 65 can be of any suitable type, such as felt, fiber glass, or other suitable materials and if desired can also be affixed to the front lower panel 20, side walls 16 and 17, and bottom plate 12.

The transmitted noise of the motor 37 and blower unit 36, as well as of the moving air is effectively suppressed, this being further enhanced if the ducts 48 and 49 are of material which does not transmit mechanical vibrations and if the mounting at the tracks 51 and 52 is cushioned.

The panel 21 can be provided with a toggle switch 66 which is in an energizing circuit (not shown) for supplying electrical energy to the motor 37.

A warning light 67 is provided mounted in panel 21 and with an appropriate placard under it to remind personnel to change filters when it is blinking.

The light 67 is energized by a simple circuit (not shown) of well known type which has an indicator (not shown) which measures the flow of air through outlet 57 and when the volume of air falls below a predetermined level will trigger the circuit to cause the light 67 to blink until the pre-filter 40 or the final filter assembly 46 is replaced and the flow of air is restored to normal.

In use upon operation of the motor 37 the blower unit 36 is actuated to draw air through the grille 22 above the wall panel 62 and around the outside of the inlet duct 48 and the rear end of the panel 62 and into the pre-filter 40. Air drawn through the pre-filter 40 by the blower unit 36 is delivered through the inlet duct 48, the filter 43, and the outlet duct 49 to the air delivery outlet pipe 57.

The air, in its passage through the pre-filter 40 and filter 43 has contaminants, including particles of the size of bacteria and viruses removed, so as to be not only dust free but also clean.

The delivered air is not only useful for individual rooms or patient enclosure including operating rooms in hospitals but for clean rooms or clean benches in manufacturing plants. In such clean rooms the presence of dust is eliminated to a very high order as it interferes with the assembly in such a room of dust free electronic or mechanical components.

It will thus be seen that an air purifier apparatus has been provided for effectively carrying out the objects of the invention.

I claim:

1. Air purifier apparatus comprising:
   a closed portable housing having top, bottom and opposite side walls,
   said housing having a horizontal central interior wall extending from one of said side walls and having a terminal portion in spaced relation to an opposite side wall,
   a blower unit and operating motor therefor disposed within said housing and below said interior wall,
   vibration isolating mounting means within said housing for said unit and motor,
   one of said side walls, above said interior wall, having an air inlet opening,
   a prefilter connected to the inlet of said blower unit,
   a filter mounted within said housing above said interior wall,
   an inlet duct for said filter connected to said filter and extending past said terminal portion and detachably connected to said blower unit,
   said interior wall guiding air entering through said opening therealong for passage around said terminal portion and below said interior wall to said prefilter,
   said housing at the upper portion thereof having an air delivery outlet to which said filter is detachably connected.

2. Air purifier apparatus as defined in claim 1 in which
   one of said side walls is hingedly mounted for access to the interior of said housing.

3. Air purifier apparatus as defined in claim 1 in which said housing has mounted therein above said interior wall spaced elongated tracks on which said filter is slidably carried.

4. Air purifier apparatus as defined in claim 1 in which said interior wall, side walls below the interior wall, and the bottom wall have sound absorbing panels interiorly disposed thereon.

5. Air purifier apparatus as defined in claim 4 in which
   said filter is connected to said blower unit by a duct member of flexible fabric having freedom from mechanical vibration transmission.

6. Air purifier apparatus as defined in claim 1 in which
   one of said side walls is hingedly mounted for access to the interior of said housing,
   said housing has mounted therein and carried on others of said side walls and spaced above said interior wall spaced elongated tracks on which said filter is slidably carried,
   said interior wall, side walls below the interior wall and the bottom wall have sound absorbing panels disposed interiorly thereon, and
   said filter is connected to said blower unit by a duct member of flexible fabric having freedom from mechanical vibration transmission.

References Cited
UNITED STATES PATENTS

| | | | |
|---|---|---|---|
| 1,844,728 | 2/1932 | Weber | 55—473 |
| 2,415,621 | 2/1947 | Arnhym | 55—467 |
| 2,528,301 | 10/1950 | Doe | 55—467 |
| 2,621,755 | 12/1952 | Gray, Jr. | 55—467 |
| 2,633,842 | 4/1953 | Higgs | 55—385 |
| 2,700,362 | 1/1955 | Galling | 55—473 |
| 2,873,908 | 2/1959 | Powers | 55—467 |
| 2,999,448 | 9/1961 | Abler et al. | |
| 3,158,457 | 11/1964 | Whitfield | 55—473 |
| 3,277,638 | 10/1966 | Soltis | 55—473 |

HARRY B. THORNTON, *Primary Examiner.*

B. NOZICK, *Examiner.*